United States Patent [19]
Okamoto et al.

[11] Patent Number: 5,287,691
[45] Date of Patent: Feb. 22, 1994

[54] METAL CORD AND COMPOSITE MATERIAL COMPRISING THE METAL CORD AND RUBBER

[75] Inventors: Kenichi Okamoto; Yoshifumi Nishimura, both of Itami; Kazuhiko Kawamura, Akashi, all of Japan

[73] Assignees: Sumitomo Electric Industries, Ltd.; Sumitomo Rubber Industries, Ltd., Osaka, Japan

[21] Appl. No.: 924,936

[22] Filed: Aug. 5, 1992

[30] Foreign Application Priority Data

Aug. 6, 1991 [JP] Japan ................... 3-196671
Jul. 15, 1992 [JP] Japan ................... 4-188180

[51] Int. Cl.$^5$ ............................. D02G 3/48
[52] U.S. Cl. ........................ 57/236; 57/311; 57/902
[58] Field of Search ............ 57/200, 206, 236, 241, 57/242, 311, 902

[56] References Cited

U.S. PATENT DOCUMENTS

| | | | |
|---|---|---|---|
| 1,615,790 | 1/1927 | Forbes et al. | 57/200 X |
| 4,333,306 | 6/1982 | Yamashita et al. | 57/902 X |
| 4,509,318 | 4/1985 | Yoneda | 57/902 X |
| 4,718,470 | 1/1988 | Kusakabe et al. | 57/902 X |
| 4,738,096 | 4/1988 | Hatakeyama et al. | 57/206 |
| 4,749,017 | 6/1988 | Loesch | 57/902 X |
| 4,938,015 | 7/1990 | Kinoshita | 57/902 X |

*Primary Examiner*—Joseph J. Hail, III
*Attorney, Agent, or Firm*—Wenderoth, Lind & Ponack

[57] ABSTRACT

A metal cord is formed by twisting two spirally preshaped metal filaments together with a twisting pitch P. The metal filament has not only the spiral shape formed by twisting, but retains so much of its spiral preshape as to have a pitch p equal to 0.20–0.50 times the twisting pitch and a diametric height h of 0.05–0.25 mm. The retained spiral shape is in the same rotary direction as the direction in which the filaments are twisted together.

2 Claims, 2 Drawing Sheets p : Preshaping pitch
h : Preshaping height

METAL CORD AND COMPOSITE MATERIAL COMPRISING THE METAL CORD AND RUBBER

BACKGROUND OF THE INVENTION

This invention relates to a metal cord for reinforcing a rubber article having excellent corrosion resistance and fatigue resistance and to a composite material comprising rubber and the metal cord embedded in the rubber as a reinforcing material, such as a vehicle tire, a conveyor belt and a high-pressure hose.

A metal cord for reinforcing a rubber article is made of high carbon steel wires (JIS G 3502 piano wire rods) having their surfaces placed with brass, copper or zinc in order to impart thereto an adhesive property with rubber. Such wires are drawn to a diameter of 0.1 to 0.5 mm and are then twisted in a single layer or in a plurality of layers. They are widely used as reinforcing materials for vehicle tires, conveyor belts and high-pressure hoses. For example, of a radial tire for a passenger car, metal cords having a 1×4 or 1×5 single-layer twisting construction which are formed by twisting four or five metal filaments together are used as a reinforcement of the belt portion.

The quality characteristics required for a metal cord for reinforcing rubber include adhesion with rubber, resistance to corrosion, resistance to fatigue and various mechanical properties (such as breaking load, rigidity, etc.). Firstly, we shall discuss the resistance to corrosion. If part of the metal cord embedded in rubber were not covered with rubber, or if the tire were to ride over a stone or a nail while travelling on a road and the damage in the tire caused by the stone or nail were to reach the metal cord, water could infiltrate through the damaged part into the cord and cause a premature corrosion of the cord, thus lowering its breaking load and fatigue resistance. Also, the adhesion strength between the cord and rubber will decrease, causing peeling and thus separation. The quality of the tire would drop markedly.

The widely used 1×5 or 1×4 closed cords (C.C.) have sections as shown in FIGS. 4A, 4B. In the center of these metal cords, there exists a rubber-free hollow space because rubber penetration into the cord is insufficient. A composite material comprising rubber and a metal cord having such a hollow space has a short life, because water can infiltrate into the hollow space, thus causing such problems as corrosion of the metal cord and separation between the metal cord and rubber.

Trials have been made to eliminate such rubber-free portions to improve the metal cords. For example, Japanese Unexamined Patent Publication 55-90962 discloses an open cord as shown in FIG. 5 in which the metal filaments 2 are twisted together in such a way as to form gaps between the adjacent metal filaments. Japanese Examined Patent Publication 58-31438 proposes as shown in FIG. 6 a parallel 2+2 cord having substantially no hollow space inside. Both cords are actually being used as reinforcing materials for tires.

Efforts are being made to reduce the emission of exhaust gas from automobiles in order to answer the growing concerns about environmental protection. Vigorous efforts are especially directed to the development of low fuel-consumption cars, because reductions in fuel consumption directly lead to reductions in the emission of exhaust gas. It is also required that vehicle tires to be lightweight in order to reduce the rolling resistance as well as the entire vehicle weight. For this purpose, trials have been made to reduce the diameter of the metal cord and to simplify the twisted configuration of the cord to reduce the thickness of the rubber covering.

For example, Unexamined Japanese Patent Publications 62-117893 and 62-234921 disclose very simple 1×2 cords in which two metal filaments 2 are simply twisted together as shown in FIGS. 2(A)-2(C). This type of cord is free of spaces inside and thus their filaments are entirely covered with rubber aspect for the contact portions between the filaments. Resistance to corrosion is thus good. Unexamined Japanese Patent Publication 2-229286 teaches a 1×2 cord in which the degree of preshaping of the two filaments are set within such a range as to provide partial gaps between the metal filaments, thus improving the rubber covering ratio and thus the corrosion resistance.

The 1×2 cords disclosed in Unexamined Japanese Patent Publications 62-117893 and 62-234921 exhibit excellent corrosion resistance because they are completely covered with rubber and also serve to reduce the weight of vehicle tires because they are made up of a minimum number of filaments. But they have drawbacks. Namely, in order to use 1×2 cords in a passenger car tire in place of 1×4 or 1×5 cords, which have heretofore been widely used, filaments having a larger diameter had to be used in order to maintain the same tenacity and rigidity as those of the metal cords made of greater number of filaments. Also, as viewed in cross section as in FIGS. 2B and 2C, 1×2 cords have their filaments arranged either horizontally of vertically. Thus, they have irregular shapes in the longitudinal direction.

A cord made of metal filaments having a large diameter and having irregular shapes in the longitudinal direction exhibits inferior resistance to fatigue (bending fatigue and compressive fatigue). If it is used in a belt portion of a passenger car tire, compressive stress will act on the metal cord repeatedly due to buckling while the car is turning a corner at high speed. This cord exhibits poor resistance to compressive fatigue to such repeated buckling.

SUMMARY OF THE INVENTION

An object of this invention is to provide a corrosion-resistant, lightweight 1×2 metal cord with exhibits improved resistance to fatigue such as bending fatigue and compressive fatigue, and a composite material such as a tire, a conveyor belt or a high-pressure hose, using the abovementioned metal cord as a reinforcing material.

According to the present invention, in order to solve the above problems, there is provided a metal cord formed by twisting two spirally preshaped metal filaments together, the filaments having not only a spiral shape formed when twisting the filaments together, but retaining so much of their original spiral shape as to have a pitch p equal to 0.20-0.50 times the twisting pitch and a diametric height h of 0.05-0.25 mm, and spiralling in the same direction as the one in which the filaments are twisted together.

Before twisting the two metal filaments into the cord with a twisting pitch P, the preshaped metal filaments preferably have a pitch p1 of 0.25-1.0 times the twisting pitch P and a diametric height h1 of 0.18-0.50 mm in the same direction as the twisting direction. When the metal filaments are twisted together the pitch p1 changes to pitch p and the height h1 to height h.

Both of two metal filaments have to be preshaped into a spiral shape. If only one of the two is preshaped, the external load exerted after the cord is formed will concentrate on the non-preshaped filament, thus lowering the breaking load and the fatigue resistance of the cord.

The composite material according to the present invention may be a tire, a conveyor belt, a high-pressure hose, etc. which comprises a rubber constituent including natural or synthetic rubber as a main component, and the above-described metal cord embedded in the rubber as a reinforcing material. This composite material shows higher durability than any other conventional composite material using a metal cord made by twisting two filaments together.

The metal filaments are preferably plated with a metal such as brass, copper, zinc or a ternary alloy comprising brass plus Co, Ni, Sn or the like to improve adhesiveness with rubber.

The metal cord according to the present invention is formed by twisting two metal filaments together. In this state, the filaments have a retained spiral shape in addition to the spiral shape formed when the filaments are twisted together. Such a metal cord is formed e.g. by twisting the two filaments with a double pre-twisting device and loosening them to preshape them into a spiral shape. After separating them, the two spirally preshaped filaments are twisted together. Alternatively, the filaments may be individually preshaped by turning pins about which the filaments are wrapped to shape them into small-pitch spirals. Then, two of such preshaped filaments are twisted together. Both of these methods are simple and easy.

The two filaments of the metal cord according to the present invention keep a spiral shape having a smaller pitch then the twisting pitch of the cord. If such cords are used e.g. in a tread portion of a passenger car tire, to the metal filaments serve as springs and absorb any external energy when subjected to simple blending or compressive bending forces created while the tire is travelling on a rough road (bending) while making a sharp turn (buckling). Thus, such an external force applied to the filaments is attenuated and the fatigue properties such as resistance to repeated simple bending and compressive bending improve.

In the two-filament cords disclosed in Unexamined Japanese Patent Publications 62-117893 and 62-234921, the adjacent filaments are continuously kept in contact with each other. In contrast, according to the present invention, because of spiral shapes having a small pitch, the filaments are in contact with each other discontinuously. Between the adjacent contact portions, gaps are formed between the filaments and rubber can penetrate into the gaps. Thus, compared with the former two-filament cords, the rubber covering ratio is higher. This serves to improve the corrosion resistance. Also, because the contact portions are smaller in number, the fretting wear is reduced.

In unexamined Japanese Patent Publication 2-229286 is disclosed an open type metal cord having partial gaps between two metal filaments to improve the rubber covering ratio. But the filaments of this cord are not spirally preshaped. Thus, the fatigue properties of the cord are poor.

Unexamined Japanese Patent Publication 2-307994 teaches a method of preshaping metal filaments, in which at least one of more than three metal filaments is fed between a pair of gears meshing with each other to form it into a wavy shape before the more than three filaments are twisted together. The gaps formed between the filaments permit rubber penetration. This method has a drawback in that stress tends to concentration on the nearly two-dimensional wavy parts of the preshaped metal filament, thus lowering the fatigue resistance markedly.

Examined Japanese Utility Model Publication 80-6475 proposes an inexpensive metal cord in which the metal filaments are spirally preshaped and wrapped in a parallel relation to each other with wrapping wires with gaps formed between the filaments. This cord lacks flexibility because the filaments are not twisted together. This will worsen the formability during the tire production and the comfort of the ride while the tires are rolling.

Examined Japanese Patent Publication 63-63293 discloses a double-layered metal cord formed by twisting six spirally preshaped filaments together around two non-preshaped filaments as a core. This cord, made up of many filaments, will push up the entire weight of a passenger car tire and also its cost. Also, the use of the core strand made of the two non-preshaped filaments will pose quality problems.

The metal cord according to the present invention is free of these problems and has improved fatigue properties and corrosion resistance. Thus, it will improve the durability of a rubber article.

The pitch p of the retained spiral preshape of the filaments should be 0.20-0.50 times the twisting pitch P and the height h of the spiral 14 (FIG. 3) should be 0.05-0.25 mm after the filaments have been twisted together into a cord. This is for the following reasons. Namely, if the pitch p of the spiral shape were larger, the effects of the spiral preshape would tend to disappear due to frictional resistance from the guides. Thus, the fatigue resistance will drop. In contrast, too small of a pitch will, corresponding to a large degree of twisting of the filaments, cause insufficient cord strength or insufficient rubber penetration due to a reduced gap formed between the filaments. Thus, the pitch p of the retained spiral shape after twisting should preferably be 0.20-0.50 times the twisting pitch P.

As for the diametric height h, the greater its value, the more effectively external forces are cushioned and the more the fatigue properties are improved. Taking also into consideration the size of the gaps which permits rubber penetration between the spirally preshaped metal filaments, its lower limit is set at 0.05 mm. If the diametric height h were too large, the cord diameter would be correspondingly large or it would become difficult to maintain the uniformity of twisting of the cord. Thus, its upper limit should be 0.25 mm provided the metal filaments used have an ordinary diameter and are twisted together into a cord with the pitch identified above.

On the other hand, the height h1 of the spiral preshape before the filaments are twisted together should be 0.18-0.50 mm. The filaments are preferably preshaped into a spiral shape in the same direction as the direction in which the filaments are to be twisted together into a cord. The reason therefor is as follows. If the preshaping direction is opposite to the twisting direction, the spiral preshape will become undone when the filaments are twisted together into a cord. As a result, the pitch of the spiral shape of the filaments will increase. This makes it necessary to preshape the filaments into a spiral shape having a still smaller pitch. If the pitch is small, the manufacture of the preshaped filaments is difficult and stable twisting is impossible with a buncher type twisting machine. By twisting the filaments together in the same direction as the preshaping direction, the spiral preshape can be further twisted when twisting the filaments together into a cord, so that the pitch of the spiral shape will decrease further. This means that when preshaping, the pitch of the spiral shape may be greater than the pitch of spiral shape required after the filaments have been twisted together into a cord. Thus, the preshaping is easy and the filaments can be twisted stably.

Taking into consideration that fact that since the pitch of the spiral shape reduces when twisting the filaments into a cord, the pitch p1 of the spiral shape of the filaments before being twisted together should be greater than the pitch p of the retained spiral shape required after the filaments have been twisted together into a cord, and should be 0.25-1.0 times the twisting pitch P.

The height h1 of the spiral preshape reduces with the reduction in the pitch of spiral shape when the filaments are twisted together and also reduces by contact with the twisting rollers and the straightening rollers after twisting. Considering these facts, the height h1 of the spiral preshape should be 0.18-0.50 mm which is larger than the height h after twisting.

The terms "pitch" and "height" herein used with respect to the spiral shape are represented by p and h in FIG. 3.

The metal filaments typically have a diameter of 0.1-0.5 mm. In case of a metal cord formed by twisting two metal filaments together, like the one according to the present invention, the filament diameter should be preferably within the range of 0.27-0.35 mm. Filaments having different diameters from each other may be twisted together. The respective metal filaments should be twisted together with the same pitch within the range of 5-20 mm. If the twisting pitch is less than 5 mm, the productivity in the cord manufacture will be too low. If the twisting pitch is greater than 20 mm, the filaments may spread apart at the end of the cord when cutting the cord or the flexibility of the cord may drop.

Practically speaking, in the case of a two-filament cord like the one according to the present invention, the filaments are preferably twisted together with a pitch of 10-16 mm.

As described above, the cord according to the present invention co of two spirally preshaped metal filaments. Thus, it exhibits improved fatigue properties when subjected to simple bending or compressive bending forces. Further, the gaps formed between the filaments serve to improve the rubber covering ratio and thus improve the corrosion resistance and reduce the fretting wear. A composite material made of the above-described metal cord and rubber, such as a tire, a conveyor belt or a high-pressure hose, has improved fatigue resistance and corrosion resistance. Such a composite material has a long life and is lightweight too.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1A:
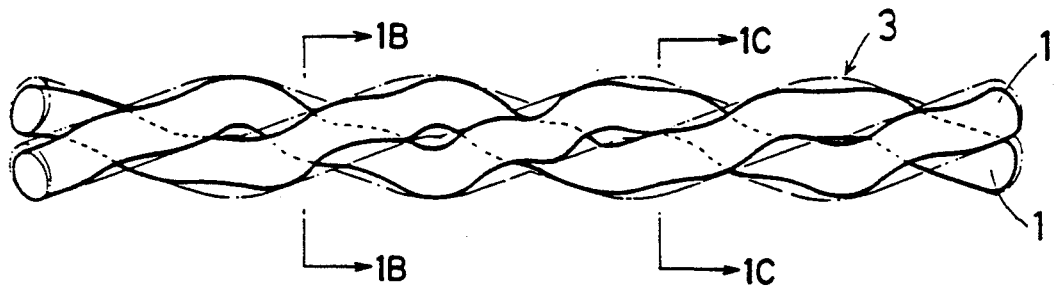
FIG. 1A is a view of an embodiment of the metal cord of the present invention.
Figure 1B:
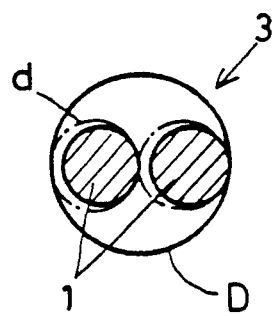
FIG. 1B is a sectional view taken along line b—b of FIG. 1A.
Figure 1C:
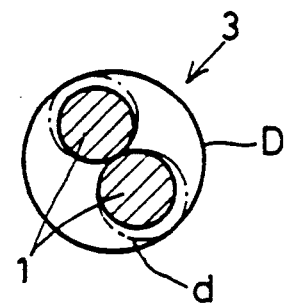
FIG. 1C is a sectional view taken along line c—c of FIG. 1A.
Figure 3:
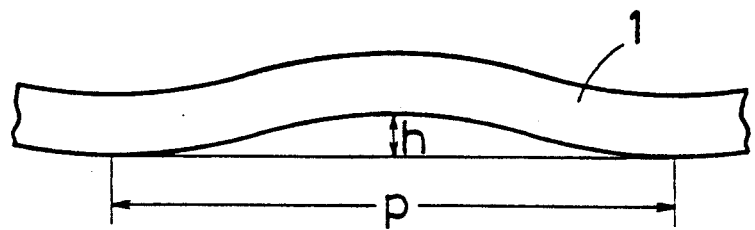
FIG. 3 is a plan view of a spirally preshaped metal filament.
Figure 4A:
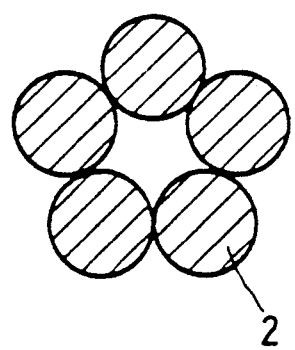
FIG. 4A is a sectional view of a 1×5 closed cord.
Figure 4B:
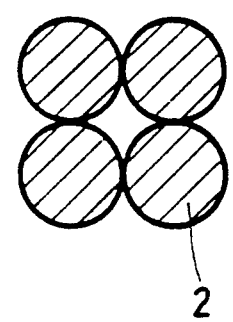
FIG. 4B is a sectional view of a 1×4 closed cord.
Figure 5:
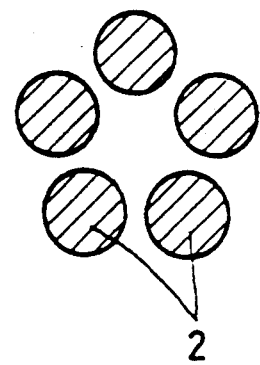
FIG. 5 is a sectional view of a 1×5 open cord.
Figure 6:
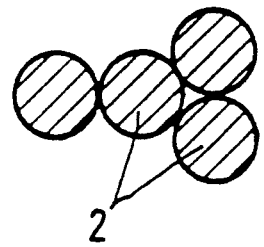
FIG. 6 is a sectional view of a parallel 2+2 cord.

We prepare a spirally preshaped metal cord (S.C) 3 (Embodiment 1) as shown in FIG. 1A by preshaping two brass-plated metal filaments having a diameter of 0.3 mm and twisting them together with a twisting pitch of 14 mm. After twisting the filaments into a cord, each metal filament 1 keeps a preshaped spiral shape, the preshaped spiral shape having a diametric height of 0.08 mm and a pitch 0.3 times the twisting pitch. Thus, each metal filament extends in a double spiral. Namely, each metal filament extends spirally while inscribing a circle, projected along the path along which the filament is twisted, having a diameter d with a spiral pitch equal to 0.3 times the twisting pitch from FIG. 3, the diameter d is equal to the diameter of the filament, in this case 0.3 mm, plus the diametric height h of 0.08 mm. On the other hand, the circle having a diameter d extends spirally while inscribing a circle having a diameter D, which is the diameter of the cord.

We also prepared an S.C cord having filaments retaining a preshaping diametric height of 0.10 mm and a preshaping pitch 0.5 times the twisting pitch (Embodiment 2), an S.C cord having filaments retaining a preshaping diametric height of 0.20 mm and a preshaped pitch 0.3 times the twisting pitch (Embodiment 3), and an S.C cord having filaments retaining a preshaping diametric height of 0.4 mm and a preshaping pitch 0.6 times the twisting pitch (Comparative Example 2), the metal filaments being of the type described above.

Figure 2A:
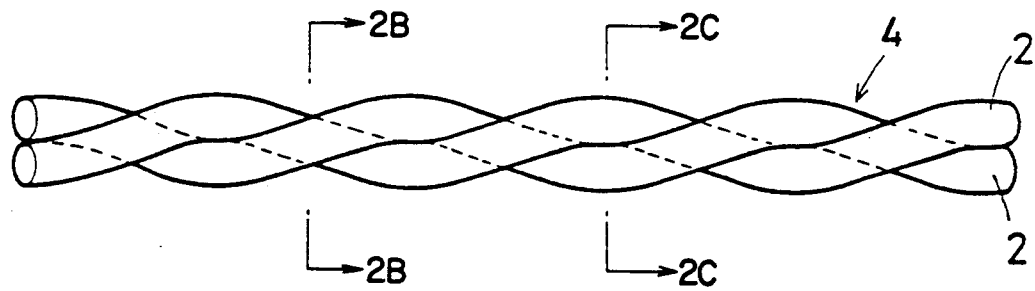
FIG. 2A is a view of a conventional compact cord formed by twisting two filaments together.
Figure 2B:
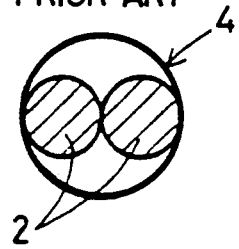
FIG. 2B is a sectional view taken along line 2B—2B of FIG. 2A.
Figure 2C:
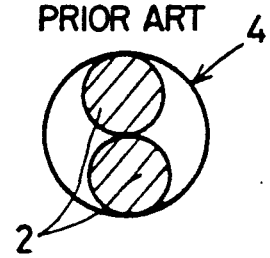
FIG. 2C is a sectional view taken along line 2C—2C of FIG. 2A.

Further, as a Comparative Example 1, we prepared a conventional 1×2×0.30 compact cord (C.C) 4 as shown in FIG. 2.

Also, we prepared a spirally preshaped cord (S.C) by twisting two brass-plated metal filaments having a diameter of 0.28 mm with a twisting pitch of 12 mm (Embodiment 4).

After being twisted together, the two metal filaments 1 of this cord retained a preshaping diametric height of 0.07 mm and a preshaping pitch equal to 0.3 times the twisting pitch and extended in double spirals.

By use of the same metal filaments, we also prepared an S.C cord having filaments retaining a preshaping diametric height of 0.12 mm and a preshaping pitch 0.5 times the twisting pitch (Embodiment 5), an S.C cord having filaments retaining a preshaping diametric height of 0.22 mm and a preshaping pitch 0.3 times the twisting pitch (Embodiment 6), and an S.C cord having filaments retaining a preshaping diametric height of 0.04 mm and a preshaping pitch 0.6 times the twisting pitch (Comparative Example 4).

Further, as a Comparative Example 3, we prepared a conventional 1×2×0.28 compact cord (S.C) 4 as shown in FIG. 2.

Next, we embedded these specimens in rubber and determined the rubber covering ratio as a property indicative of the corrosion resistance. Also, the cords alone were subjected to a bending fatigue test to determine fatigue resistance, and the composite materials made of the respective cords and rubber were tested for fatigue resistance when compressed in an axial direction of the cords. The test results are shown in Table 1.

As will be apparent from this Table, the Embodiments 1-8 showed better rubber penetration and far higher rubber covering ratio then the Comparative Examples 1 and 2 which are the conventional cords. Also, the Embodiments showed better results in the bending fatigue test and the compressive fatigue test than the Comparative Examples 1-4.

along a respective path along which the filament is twisted about the other filament, said inner circle having a diameter d equal to the diameter of the filament plus 0.05-0.25 mm, the spiralling of each of said filaments within the inner projected circle of diameter d occurring in the same rotary direction as said direction of twist, and the pitch of said spiral shape being 0.20-0.50 times said twisting pitch P.

2. A composite material comprising a main component of rubber and a metal cord embedded in and reinforcing the rubber main component, said metal cord consisting of two spirally shaped filaments twisted about one another in a direction of twist at a twisting pitch P, each of said filaments while extending in said direction of twist also retaining a spiral shape inscribing a respective inner circle projected along a respective path along which the filament is twisted about the other filament, said inner circle having a diameter d equal to the diameter of the filament plus 0.05-0.25 mm, the spiralling of each of said filaments within the inner

TABLE 1

| | Size and twisting construction (twisting pitch · twisting direction) | Preshaping shape | | | | | | | Rubber covering ratio (%)[*1] | Bending fatigue of cord itself[*2] | Compressive fatigue as composite body[*3] |
|---|---|---|---|---|---|---|---|---|---|---|---|
| | | Before twisting | | | | After twisting | | | | | |
| | | Pitch $p_1$ | $p_1/P$ | Height $h_1$ | Direction | Pitch $p$ | $p/P$ | Height $h$ | | | |
| Comparative example 1 | 1 × 2 × 0.30 C . C (14 S) | — | — | — | — | — | — | — | 5 | 100 | 100 |
| Comparative example 2 | 1 × 2 × 0.30 S . C (14 S) | 21 | 1.5 | 0.30 | S | 8.4 | 0.6 | 0.04 | 40 | 102 | 100 |
| Embodiment 1 | 1 × 2 × 0.30 S . C (14 S) | 6 | 0.43 | 0.30 | S | 4.2 | 0.3 | 0.08 | 80 | 113 | 110 |
| Embodiment 2 | 1 × 2 × 0.30 S . C (14 S) | 14 | 1.0 | 0.30 | S | 7.0 | 0.5 | 0.10 | 90 | 111 | 104 |
| Embodiment 3 | 1 × 2 × 0.30 S . C (14 S) | 6 | 0.43 | 0.45 | S | 4.2 | 0.3 | 0.20 | 95 | 107 | 116 |
| Comparative example 3 | 1 × 2 × 0.28 C . C (12 S) | — | — | — | — | — | — | — | 5 | 105 | 103 |
| Comparative example 4 | 1 × 2 × 0.28 S . C (12 S) | 18 | 1.5 | 0.32 | S | 7.2 | 0.6 | 0.04 | 50 | 108 | 102 |
| Embodiment 4 | 1 × 2 × 0.28 S . C (12 S) | 5 | 0.42 | 0.32 | S | 3.6 | 0.3 | 0.07 | 75 | 114 | 118 |
| Embodiment 5 | 1 × 2 × 0.28 S . C (12 S) | 12 | 1.0 | 0.32 | S | 6.0 | 0.5 | 0.12 | 90 | 113 | 114 |
| Embodiment 6 | 1 × 2 × 0.28 S . C (12 S) | 5 | 0.42 | 0.50 | S | 3.6 | 0.3 | 0.22 | 95 | 112 | 124 |

[*1]Ratio of length of portion of two filaments where filament inside is packed with rubber to the entire length of the cord, measured after buried in rubber and vulcanized and sampled and untwisted.
[*2]Number of repeated bendings to failure measured with a bending testing with bending angle of 90° and bending radius of 10 mm, indicated as relative index with comparative example 1 (conventional cord 1 × 2 × 0.30 c.c) used as reference (100).
[*3]Number of repeated applications of a predetermined compressive force to a composite body having cords embedded in rubber in an axial direction before cord breakage occurred due to compressive bending (radius of curvature: 10 mm), indicated as relative index with comparative example 1 (coventional cord 1 × 2 × 0.30 c.c) used as reference (100). Cord breakage was determined by X-ray fluoroscopy.

What is claimed is:

1. A metal cord consisting of two spirally shaped filaments twisted about one another in a direction of twist at a twisting pitch P, each of said filaments while extending in said direction of twist also retaining a spiral shape inscribing a respective inner circle projected projected circle of diameter d occurring in the same rotary direction as said direction of twist, and the pitch of said spiral shape being 0.20-0.50 times said twisting pitch P.

* * * * *